(12) United States Patent
Stark

(10) Patent No.: US 11,708,931 B2
(45) Date of Patent: *Jul. 25, 2023

(54) TUBULAR LINER FOR THE REHABILITATION OF A SEWER PIPE

(71) Applicant: BUERGOFOL GMBH, Siegenburg (DE)

(72) Inventor: Kurt Stark, Neuhaus a.d. Pegnitz (DE)

(73) Assignee: BUERGOFOL GMBH, Siegenburg (DE)

( * ) Notice: Subject to any disclaimer, the term of this patent is extended or adjusted under 35 U.S.C. 154(b) by 26 days.

This patent is subject to a terminal disclaimer.

(21) Appl. No.: 17/460,562

(22) Filed: Aug. 30, 2021

(65) Prior Publication Data

US 2021/0388935 A1 Dec. 16, 2021

Related U.S. Application Data

(63) Continuation of application No. 16/358,899, filed on Mar. 20, 2019, now Pat. No. 11,105,455.

(30) Foreign Application Priority Data

Mar. 20, 2018 (DE) .......................... 102018106561.2

(51) Int. Cl.
*F16L 55/16* (2006.01)
*F16L 55/165* (2006.01)
(Continued)

(52) U.S. Cl.
CPC ............ *F16L 55/1656* (2013.01); *B32B 1/08* (2013.01); *B32B 5/022* (2013.01); *B32B 5/024* (2013.01);
(Continued)

(58) Field of Classification Search
CPC .......................... F16L 55/1656; F16L 55/1654
(Continued)

(56) References Cited

U.S. PATENT DOCUMENTS 4,581,247 A * 4/1986 Wood ..................... B29C 63/36
427/508
4,723,579 A 2/1988 Hyodo
(Continued)

FOREIGN PATENT DOCUMENTS

CN 1957198 A 5/2007
DE 10 2009 041841 7/2010
(Continued)

OTHER PUBLICATIONS

German Patent Office Search Report, dated Nov. 19, 2018, 14 pages.
(Continued)

*Primary Examiner* — James F Hook
(74) *Attorney, Agent, or Firm* — Dority & Manning, P.A.

(57) ABSTRACT

The invention relates to a tubular liner for the rehabilitation of an, in particular, underground sewer pipe, comprising at least an inner tubular film, a resin-carrier layer surrounding the inner tubular film, and comprising a mechanically protective outer film system. The outer film system comprises at least one outer film in the form of a UV-radiation- and short-wavelength, visible light-absorbing and/or -reflecting, single-layer or multi-layer film which contains, in one or more polymer layers, at least one short-wavelength, visible light-absorbing and/or—reflecting, organic or inorganic color pigment or a corresponding dye, and at least one organic or inorganic compound which absorbs and/or reflects the UV radiation. Moreover, the outer film system comprises at least one mechanically stable reinforcing web which rests on the aforementioned outer film. The outer film system has a transmittance for visible light at at least one
(Continued)

wavelength in the range of 550 nm to 800 nm of at least 1%. The invention also relates to a method for manufacturing such an outer film system and to such an outer film system itself.

19 Claims, 6 Drawing Sheets

(51) Int. Cl.
  *B32B 5/02* (2006.01)
  *B32B 7/12* (2006.01)
  *B32B 27/12* (2006.01)
  *B32B 27/20* (2006.01)
  *B32B 27/32* (2006.01)
  *B32B 27/18* (2006.01)
  *B32B 1/08* (2006.01)
  *B32B 27/36* (2006.01)

(52) U.S. Cl.
  CPC ............... *B32B 7/12* (2013.01); *B32B 27/12* (2013.01); *B32B 27/18* (2013.01); *B32B 27/20* (2013.01); *B32B 27/32* (2013.01); *B32B 27/36* (2013.01); *F16L 55/1654* (2013.01); *B32B 2260/021* (2013.01); *B32B 2260/046* (2013.01); *B32B 2262/0276* (2013.01); *B32B 2307/402* (2013.01); *B32B 2307/41* (2013.01); *B32B 2307/416* (2013.01); *B32B 2307/50* (2013.01); *B32B 2307/54* (2013.01); *B32B 2307/5825* (2013.01); *B32B 2307/71* (2013.01); *B32B 2307/732* (2013.01); *B32B 2597/00* (2013.01)

(58) Field of Classification Search
  USPC ................ 138/97, 98; 405/150.1, 184.2
  See application file for complete search history.

(56) References Cited

U.S. PATENT DOCUMENTS

| | | |
|---|---|---|
| 5,334,429 A | 8/1994 | Imoto |
| 5,836,357 A | 11/1998 | Kittson |
| 6,196,271 B1 | 3/2001 | Braun |
| 8,361,580 B2 | 1/2013 | Stark et al. |
| 9,334,998 B2 | 5/2016 | Duttenhoefer |
| 9,656,438 B2 | 5/2017 | Stark |
| 9,657,882 B2 | 5/2017 | Stark et al. |
| 9,897,242 B2 | 2/2018 | Schleicher |
| 11,105,455 B2* | 8/2021 | Stark ................... B32B 27/20 |
| 2010/0154187 A1* | 6/2010 | Kamiyama ......... F16L 55/1656 29/402.16 |
| 2011/0083765 A1 | 4/2011 | Stark et al. |
| 2013/0126029 A1 | 5/2013 | Hummel |
| 2016/0131298 A1 | 5/2016 | Schleicher |
| 2017/0028668 A1 | 2/2017 | Boutrid |

FOREIGN PATENT DOCUMENTS

| | | |
|---|---|---|
| DE | 20 2013 103390 | 10/2014 |
| DE | 10 2014 114627 | 4/2016 |
| EP | 2 357 065 | 8/2011 |
| EP | 2 379 625 | 10/2011 |
| EP | 2 881 252 | 5/2015 |
| EP | 3 006 805 | 4/2016 |
| WO | WO 2012/159702 | 11/2012 |

OTHER PUBLICATIONS

EPO Search Report, dated Aug. 5, 2019.
Chinese Office Action, dated Nov. 30, 2021, 10 pages.

* cited by examiner

TUBULAR LINER FOR THE REHABILITATION OF A SEWER PIPE

FIELD OF THE INVENTION

The present invention relates to a tubular liner for sewer rehabilitation.

BACKGROUND OF THE INVENTION

Tubular liners for sewer rehabilitation have been known for a long time. In the case of the glass fiber tubular liner system with UV or steam curing, for example, it is known to introduce into the pipe to be rehabilitated a thick-walled film made of PE (polyethylene) having a high density (HDPE—high density polyethylene), which is known as sliding film and in the present case usually has the cross-sectional shape of a semicircle, and to apply the film on the inner wall of the pipe. Thereafter, a flexible tubular liner (also called an "insert tube" or simply a "liner"), is drawn into the pipe to be rehabilitated, wherein the tubular liner slides over the sliding film (drawing-in process). On the one hand, this prevents damage to the tubular liner by preventing contact with the inner pipe wall or objects in the pipe; on the other hand, the friction between the tubular liner and the sliding film is very low and facilitates the drawing-in of the tubular liner. This mode of operation is similar to that of a shoehorn.

In the case of the glass fiber tubular liner system with UV or steam curing, an inner tube as well as an outer tube are provided, between which a carrier material such as, in particular, glass fibers, which is impregnated with reactive plastic resin, is introduced. For example, commercially available UP resins (polyester or unsaturated polyester resins), VE resins (vinyl ester resins), or EP resins (epoxy resins) are used as the reactive plastic resin. In the case of UP or VE resins, the curing of the resins takes place, for example, with the aid of photo-initiators. However, curing may also take place thermally. The tubular insert remains inflated in the pipe or is expanded with the aid of a fluid for as long as it takes for the tubular insert to make contact with the inner pipe wall or the sliding film, in order to subsequently cure the resin, for example, with the aid of UV radiation from a UV radiation source slowly drawn through the pipe. Finally, the inner film of the tubular liner can be drawn out and removed. The layer including the carrier material is then exposed to the substances to be led through the pipe.

A tubular liner is known from U.S. Pat. No. 9,334,998, which is hereby incorporated herein by this reference for all purposes, in which a protective tube made of a tear-resistant, non-stretchable, and opaque material in the form of a truck tarpaulin material, i.e., PVC-reinforced fabric, is arranged on the outside around the combination of inner tubular film, resin-carrier layer, and outer tubular film. This protective tube has such a width that, upon the wrapping around of the outer tubular film, the two longitudinal edges do not abut one another or overlap. In order to bridge the gap (viewed in cross-section) that thus emerges between the edges of the protective tube, a connecting film piece made of a stretchable material is provided, which is connected to such edges of the protective tube. The premature curing of the resin is prevented due to the fact that the outer film is designed to be impermeable for UV radiation.

A tubular liner for trenchless sewer rehabilitation is known from U.S. Pat. No. 9,897,242, which is hereby incorporated herein by this reference for all purposes. Thereby, a mechanically protective, non-transparent outer film system is used, so that sliding films for drawing in the liner can be dispensed with. The outer film system is essentially impermeable for UV and visible light, which can be realized, for example, by using an additional opaque UV- and light protective film, as is known in many cases from the state of the art.

Moreover, U.S. Pat. No. 8,361,580, which is hereby incorporated herein by this reference for all purposes, discloses the features of the preamble, describes an outer contact-transparent UV and light protective film, wherein no mechanical protection is provided for the tubular liner, however, and so the tubular liner would run the risk of becoming damaged or destroyed upon being drawn into the sewer pipe. Attempts are made to avoid this by using an above-described sliding film, which slides the tubular liner into the sewer pipe to be rehabilitated, in the manner of a shoehorn.

BRIEF OBJECTS AND SUMMARY OF THE INVENTION

The problem addressed by the present invention is that of creating a tubular liner having improved functionality, in particular with respect to handling, practicality, and durability.

The invention therefore provides a tubular liner which, in accordance with the invention, on the one hand, comprises a mechanically stable outer film system, which has a transmittance for visible light at at least one wavelength in the range of 550 nm to 800 nm of at least 1%, and also prevents premature curing of the resin (e.g., during storage) by blocking UV radiation and short-wavelength light; in the presence of longer-wavelength light of approximately 500 nm and higher, the resin does not cure, however. Both the UV-radiation- and short-wavelength, visible light-absorbing and/or -reflecting, single-layer or multi-layer film, which is referred to only as "outer film" in the following, for simplicity, and the at least one reinforcing web of the outer film system are designed in such a way that the outer film system overall has a transmittance for visible light at at least one wavelength in the range of 550 nm to 800 nm of at least 1%. In the following, this transmission property of the outer film system is also referred to as "translucence" or "translucent". The described degree of translucence of visible light at at least one wavelength in the range of 550 nm to 800 nm is found, in particular, in the UV-Vis spectrum.

The transmittance of the outer film system results from the multiplication of the transmittances of the components of the outer film system, which are arranged one behind the other in the direction of transmittance, i.e., in the present case, at least the at least one outer film and the at least one reinforcing web. These transmittances of the components of the outer film system are selected in such a way that their transmittance for visible light at a wavelength of 550 nm to 800 nm and higher at at least one wavelength is at least 1%. The angle of incidence of the light waves is defined in the present case as perpendicular to the surface of the outer film system. It is understood that a suitable thickness of the components of the outer film system is to be selected in order to achieve this transmittance.

The improved handling of the outer film system in accordance with the invention and of the tubular liner is due—after the curing of the resin—to the better detectability of the points at which inlets and outlets to the (main) sewer pipe, i.e., branches, are to be installed. In contrast to a completely opaque and non-transparent outer film system, it is now possible, after the curing of the tubular liner in the sewer pipe, to make the inlets visible, which a robot, for example, must mill out when the sewer pipe is to have a branch, an inlet, or an outlet at this point. Therefore, when a camera is introduced into the interior of a cured tubular liner and a robot or another appropriate device is moved to the point at which a branch away from the rehabilitated sewer pipe or an inlet or outlet is to be installed, this point can be readily exactly localized.

The translucence of the tubular liner in accordance with the invention is effectuated, in particular, by the outer film system, since the remaining components—i.e., in particular, a resin-carrier system and an inner film (provided this even remains in the finally installed sewer pipe)—are generally substantially more transparent for visible light (here: at a wavelength of 550 nm and higher) than, in particular, the mechanically stable reinforcing web.

In particular, the inlets and the outlets to and from the sewer pipe are very easy to detect by shining a light therein from the outside, i.e., from the converging side toward the main sewer pipe (or in the opposite direction). This projected light has a certain wavelength or covers a certain wavelength range, wherein, in accordance with the invention, a transmission of at least 1% of the outer film system is present at least at a wavelength in the range of 550 nm to 800 nm, which is to be projected by this light source. This light also penetrates the cured tubular liner and, therefore, can be detected in the interior of the sewer pipe with the aid of optical detection, and so a milling robot can mill a hole for an inlet or an outlet at precisely this point.

In addition, due to optical monitoring (also) from the side of the reinforcing web, the carrier material can be impregnated with resin much better and more homogeneously, since the points of the carrier material at which resin is still missing can be directly detected.

Due to the mechanical stability, the tubular liner is also protected from damage while being drawn into a sewer pipe to be rehabilitated, since even relatively sharp-edged irregularities along the sewer pipe wall do not slit the reinforcing web open.

The outer film system in accordance with the invention, as viewed in cross-section, can consist of a single continuous section, in which its longitudinal edges overlap and are joined together in the overlap area. Or several (preferably two) sections are provided; these partially overlap and/or are sealed together at their longitudinal edges, such that two overlapping areas or sealed seams are provided. Thereby, preferably one complete wrapping-around of the resin-carrier layer with one or more of the aforementioned outer films is provided, while one or more reinforcing webs do not need to be provided around the entire circumference, but rather, in particular, only in the mechanically more critical areas, i.e., in particular, the sewer pipe bottom.

The resistance to initial tears and further tears of the at least one reinforcing web is preferentially very high; that is, the reinforcing web is preferably practically not able to be torn or, if it is torn, the effort needed for further tearing is very high. The at least one reinforcing web preferably also has a very low to negligible elongation at least in the machine direction (MD), that is, in the production running direction. In other words, a high force is necessary in the machine direction in order to even generate a certain elongation.

The at least one reinforcing web has preferably one or more of the following mechanical properties:
a) the tensile strength longitudinal to M in accordance with DIN EN ISO 527-3 is greater than 20 N/mm$^2$, preferentially greater than 30 N/mm$^2$, most preferentially greater than 40 N/mm$^2$;
b) the tensile strength transverse to M in accordance with DIN EN ISO 527-3 is greater than 20 N/mm$^2$, preferentially greater than 30 N/mm$^2$, most preferentially greater than 40 N/mm$^2$;
c) the tensile strength in accordance with DIN EN ISO 1421 is greater than 200 N/5 cm, preferentially greater than 400 N/5 cm, most preferentially greater than 600 N/5 cm, for example, greater than 800 N/5 cm, most preferentially greater than 1000 N/5 cm;
d) the elongation at tear in a longitudinal direction (cB) and elongation at tear in a transverse direction (cB) in accordance with DIN EN ISO 527-3 and DIN EN ISO 527-3, respectively, is less than 200%, preferentially less than 100%, most preferentially less than 50%;
e) the resistance to further tears in a trapezoidal manner in a longitudinal direction or in a trapezoidal manner in a transverse direction in accordance with DIN 53363 and DIN 53363, respectively, is greater than 100 N, preferentially greater than 200 N; and/or
f) the puncture resistance in accordance with ASTM E 154 is greater than 300 N, preferentially greater than 500 N, most preferentially greater than 800 N.

With the mentioned mechanical properties, the at least one reinforcing web can withstand high loads upon being drawn into a sewer pipe to be rehabilitated.

Preferably, the outer film system has a transmittance for visible light at at least one wavelength in the range of 550 nm to 800 nm of at least 3%, particularly preferably of at least 5%. The higher the transmittance under the aforementioned conditions, the better the detectability of transmitted light.

It is particularly preferred when the at least one outer film and the at least one reinforcing web are connected to one another, in accordance with one advantageous embodiment, across the entire area of the smaller of the two films or, if the sizes are the same, across their entire areas. The aforementioned arrangement is therefore designed as a composite. This composite is easy to handle in its entirety and therefore facilitates the application onto the resin-carrier layer (or onto a film arranged over the resin-carrier layer) as well as the insertion of the tubular liner into a sewer pipe to be rehabilitated.

In accordance with one alternative, the at least one outer film rests loosely and unconnected on the at least one reinforcing web. In this case, the at least one outer film can expand upon installation (mostly realized via inflation) of the tubular liner, wherein the outer film slides along the inner side of the at least one reinforcing web and, in so doing, is capable of expanding the reinforcing web, provided the reinforcing web is not closed around the circumference.

In accordance with a preferred embodiment, the at least one reinforcing web is designed as a fabric, which preferably is a woven textile and predominantly or completely consists of polyester yarn. The woven textile preferably has a mesh size in the MD direction and/or in the CD direction of less than 2 cm auf, preferentially less than 1 cm, most preferentially less than 5 mm. The narrower the mesh size, the more stable is the fabric. On the other hand, the fabric must still guarantee at least the aforementioned translucence of the outer film system, so that the advantages in accordance with the invention result. In alternative embodiments, the fabric can be a non-woven textile.

The fabric yarn is advantageously very stable and has, for example, a yarn count of more than 100 dtex, preferentially more than 200 dtex, particularly preferentially more than 400 dtex, and most preferentially more than 1000 dtex. The tensile strength and resistance to tears of the used fabric yarn is preferentially more than 500 N/5 cm, particularly preferentially more than 1000 N/5 cm.

In the embodiment of the at least one reinforcing web comprising a fabric, the fabric in accordance with one preferred variant is wetted/coated with a polymer coating at least on one side and is preferably enclosed from both sides. The polymer coating, which, in the case of a double-sided application, can be the same or different on the two sides, is designed to be translucent, at least after drying, in order to achieve the transmission or transparency of the reinforcing web and, therefore, of the outer film system overall. Preferably, the polymer is also sealable. In the case of different consistencies of the polymer coating on each of the two sides of the fabric, for example, the layer on one side is a polyethylene, while the layer on the other side can be, for example, PVC, or even an adhesive, for example, a pressure sensitive adhesive (see further below).

In one advantageous embodiment, the reinforcing web can also be produced originating from a film, by way of the fact that the film is laminated with the fabric, with the aid of a polymer, a hot melt, or a laminating adhesive, in such a way that the film and the fabric are firmly bonded together, wherein the polymer, the hot melt, or the laminating adhesive on the side of the fabric preferably form a closed outer surface and, therefore, the fabric on the side facing away from the film is completely covered by the polymer, the hot melt, or the laminating adhesive.

Various adhesives can be used as the adhesives, i.e., solvent-free or solvent-containing, single- or multiple-component adhesives, UV acrylates, or so-called PSA (pressure sensitive adhesives), etc.

It is particularly preferred when a polymer or hot melt having adhesive properties is used. Commercially available polymers (such as LDPE, LLDPE), for example, are options for this purpose. The polymer can connect, for example, a film to a fabric within the scope of extrusion lamination.

The used film, which is connected to the fabric with the aid of a polymer or a hot melt or an adhesive, is preferably the UV-radiation- and short-wavelength, visible light-absorbing and/or reflecting outer film. Here, the fabric and the outer film, which are connected to one another with the aid of a polymer or hot melt or adhesive, form the outer film system in accordance with the invention having the aforementioned property of translucence or transmission.

In one alternative, an adhesive can be applied onto the reinforcing web, comprising the fabric and the polymer layer, and/or onto the at least one outer film, in order to connect these to one another.

In accordance with an alternative of the fabric, the reinforcing web can be designed as a single- or multiple-layer, full-area, translucent reinforcing film. For example, it is predominantly or completely made of polyester or HDPE. Other materials that impart the mechanical durability and, as required, are also translucent, are likewise readily possible.

Regardless of whether the at least one reinforcing web has a closed surface, in particular when designed as a reinforcing film, or as a fabric, the aforementioned connection of the at least one outer film with the at least one reinforcing web in accordance with advantageous embodiments can be realized by applying an adhesive onto one or both of the mutually facing sides of the at least one reinforcing web and the at least one outer film.

In general, the connection between the at least one outer film and the reinforcing web can be realized with the aid of a thermal lamination, an extrusion lamination, an adhesive lamination, a calendaring, or other types of connections known to the specialist.

Preferably, the at least one outer film is present around the entire circumference of the tubular liner, which does not apply for the reinforcing web, however, in one preferred embodiment. The idea behind this solution is that the outer film should be present around the entire circumference of the tubular liner due to its UV protection effect for the resin, but this does not necessarily need to be the case for the at least one reinforcing web. The main loading zone of the tubular liner upon being drawn into a sewer pipe is located in the area of the sewer pipe bottom and at the lateral sections on the left and the right. In this area, it is advantageous when the at least one reinforcing web is present; the mechanical load of the tubular liner is less toward the top wall of the sewer pipe, and so a reinforcing web can be dispensed with here, if necessary.

A further advantage of an only partial wrapping-around with at least one reinforcing web is that a further covering film, which has a greater ability to elongate than the reinforcing web(s), can be applied on areas of the at least one outer film that are not covered by a reinforcing web. Therefore, upon installation of the tubular liner in the sewer pipe, for the purpose of which compressed air is usually utilized, the tubular liner can elongate further in these areas not covered by the reinforcing web and can conform to the sewer pipe wall. In this way, in addition, a larger cross-section of the sewer pipe lined with the tubular liner can be achieved. The areas of the outer film not covered by the reinforcing web can elongate upon expansion of the tubular liner even without such a covering film.

Finally, it is also more economical when the reinforcing web is not used for the wrapping all the way around, but rather only for the subareas to be protected in particular.

In accordance with a corresponding embodiment, the at least one reinforcing web, which is provided for resting on the sewer pipe bottom, preferably covers in the circumferential direction of the tubular liner an angular range of more than 180°, such as more than 240°.

As mentioned above, the outer film system in accordance with the invention can consist of one or more parts, which abut one another as viewed in the circumferential direction. In one embodiment, the arrangement comprises only one single outer film, which rests on a single reinforcing web. This arrangement can extend around more than 360° as viewed in the circumferential direction and therefore includes an overlap area. This overlap area can have different configurations. For example, both the reinforcing web as well as the outer film overlap in the area of their two longitudinal edges.

The overhanging end of the arrangement (whether with or without outer film in the overlap area) can be simply placed, i.e., wrapped, onto the underlying area. Alternatively, both of their longitudinal edges can loosely overhang and extend away from the underlying tube system and can be placed one on top of the other, wherein the inner surfaces of the overhanging edges therefore rest one on top of the other (similar to the end of a sausage). This section can then be placed or folded, to one side or the other, onto the underlying tube system and, optionally, can be adhered thereto (for example, using adhesive tape or other adhesives). The abutting sections can be, for example, connected to one another, for example, sealed, which is advantageous, for example, in the case of polyethylene layers. A connection of the two sections in the overlap area is not absolutely necessary, however.

In one advantageous alternative, at least two outer films are provided, each of which extends around less than 360° in the circumferential direction, but abut one another with mutual overlap, wherein connecting points, which extend in the longitudinal direction of the tubular liner, are preferably provided between the longitudinal edges of the at least two outer films.

In accordance with one variant, these outer films each rest on a reinforcing web, preferentially coextensively, i.e., extending across the respective same areas with uniform edges.

Moreover, it is possible that two reinforcing webs are, for example, bonded at their longitudinal edges with the aid of connecting points.

The aforementioned connecting points of one or more outer films and/or one or more reinforcing webs, wherein the connecting points preferably extend in the longitudinal direction of the tubular liner, can be realized in different ways, for example, with the aid of, where applicable, double-sided tape, a thermal welding seam (sealing), a hot-melt adhesive, or another adhesive in the form of a continuous adhesive seam, i.e., sealed seam, or an interrupted adhesive application. Narrow adhesive cover strips, which connect, for example, two longitudinal edges of one or more reinforcing webs, are also possible.

One advantageous embodiment provides that, in the installed situation of the tubular liner in a sewer pipe, an upper (as viewed in cross-section) outer film is provided, which covers in the circumferential direction of the tubular liner an angular range of 180° or less than 180° and is placed from above onto a lower outer film, which extends about 180° or more than 180° in the circumferential direction, and is connected thereto at the edges. Thereby, the at least one reinforcing web preferentially rests at least on the lower outer film, at least partially or preferably completely. This design has the aforementioned advantage that the areas of the outer film(s) not covered by the reinforcing web can elongate upon expansion of the tubular liner in the sewer pipe.

The organic or inorganic color pigment or the dye in the at least one outer film preferably absorbs and/or reflects light in the wavelength range of 350 nm to 500 nm. In particular, a transmission in the wavelength range of 350 nm to 500 nm, preferably from 350 nm to 450 nm, is substantially to almost completely inhibited by the at least one layer, in particular at greater than 99%. For this purpose, the at least one outer film includes at least one layer that is essentially impermeable for UV radiation and (if applicable) visible light in the low wavelength range. For this purpose, this layer contains, for example, organic and/or inorganic color pigments, dyes and (if applicable) UV absorbers or compounds, which are known to the specialist, for example, from DE 10 2009 041 841 A1.

The organic or inorganic color pigment, which is present in the at least one outer film, is at least one color pigment selected from the group comprising carbonyl dyes, preferably quinones, indigo dyes and quinacridones, azo compounds, cyanine compounds, preferably triphenylmethane compounds, azomethines, isoindolines, dioxazines, metal oxides, transition metal oxides, metal oxide hydrates and transition metal oxide hydrates. The at least one color pigment is preferably a yellow color pigment or a yellow dye from this group.

The at least one outer film preferably has a multi-layer structure, wherein at least one of its surface layers preferably contains an olefin homo-polymer or copolymer, preferably up to more than 50 weight percent thereof.

Preferably, the thickness of the outer film system, measured in an area, in which a reinforcing web rests on an outer film, is between 50 µm and 10,000 µm, preferentially between 100 µm and 5.000 µm, and most preferentially between 200 µm and 1000 µm. For example, this thickness is less than 500 µm. The thickness of the outer film system is also matched to the transmittance to be set in accordance with the invention.

The weight per unit area of the outer film system is preferably between 100 g/m$^2$ and 1000 g/m$^2$, preferentially between 300 g/m$^2$ and 800 g/m$^2$.

A fleece or another material that is absorbent for liquids and resins is most preferably applied on the inner side of at least one of the outer films, preferably all outer films (when multiple outer films are actually present), directed to the resin-carrier layer. Within the scope of this invention, only the term "fleece" is frequently used, for the sake of brevity, wherein this is to be understood to encompass other materials that are absorbent for liquids and resins. The fleece is used for improved adhesion of the outer film(s) to the resin of the resin-carrier layer, for expelling excess air and, therefore, for ensuring the stability of the tubular liner, both during handling as well as in the installed state.

The fleece adversely affects the transmission of the light only to a small extent, since it acts in a more translucent manner, in particular upon contact with resin. The same also applies for the used carrier material, for example, glass fibers. In both cases, the transmission of visible light upon contact with resin is usually increased.

According to one alternative, at least one wrapping film or one covering film (protective film), which is optionally connected to a fleece or another material that is absorbent for liquids and resins, is arranged between the resin-carrier layer and the outer film system. The covering or protective film as well as the fleece generally have a high transmission (at least) at a wavelength of 550 nm and higher and therefore do not influence the overall transmission of the tubular liner to any significant extent. The at least one further wrapping film or covering film or protective film can be, for example, a 50 µm PE-PA-PE film with the following structure: PE 15 µm, bonding agent 5 µm, PA 10 µm, bonding agent 5 µm, PE 15 µm, laminated on a 50 g/m$^2$ fleece. The application weight of the adhesive or of the polymer for the lamination can be 15 g/m$^2$.

In order to connect the at least one outer film or a covering or protective film or a wrapping film, on the one hand, and the fleece or, in general, an absorbent material (generally a non-woven material), on the other hand, a thermal lamination, an extrusion lamination, an adhesive lamination, a calendering, or other types of connection known to the specialist can be used.

Preferably, at least one layer in the at least one aforementioned outer film and/or in the aforementioned wrapping or covering film is provided, which has a barrier function against components of the reactive resin. This barrier function is preferably realized by means of a polyamide, which functions, in particular, as a styrene barrier and prevents the passage of resin components of the resin-carrier layer. The required transmission or translucence is not influenced by these components to a significant extent.

Moreover, the invention relates to an outer film system, which is most preferentially carried out as described above and desirably is designed for use in a tubular liner for the rehabilitation of an, underground sewer pipe. Here, the tubular liner is most preferentially designed as described above.

Moreover, the invention relates to a method for manufacturing an outer film system of a tubular liner of the type described above with reference to the variant of the reinforcing web as fabric. In accordance with the method in accordance with the invention, a polymer layer is applied onto the fabric, which wets or coats the fabric at least on one side, preferably enclosing the fabric from both sides and, in one most preferential embodiment has adhesive properties in order to bond the fabric with the at least one outer film.

Finally, the invention also relates to the use of a tubular liner of the type described herein comprising an outer film system of the type described herein in trenchless sewer rehabilitation.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which six different exemplary embodiments of the invention are schematically presented in the following figures.

DETAILED DESCRIPTION OF EXEMPLARY EMBODIMENTS

Figure 1:
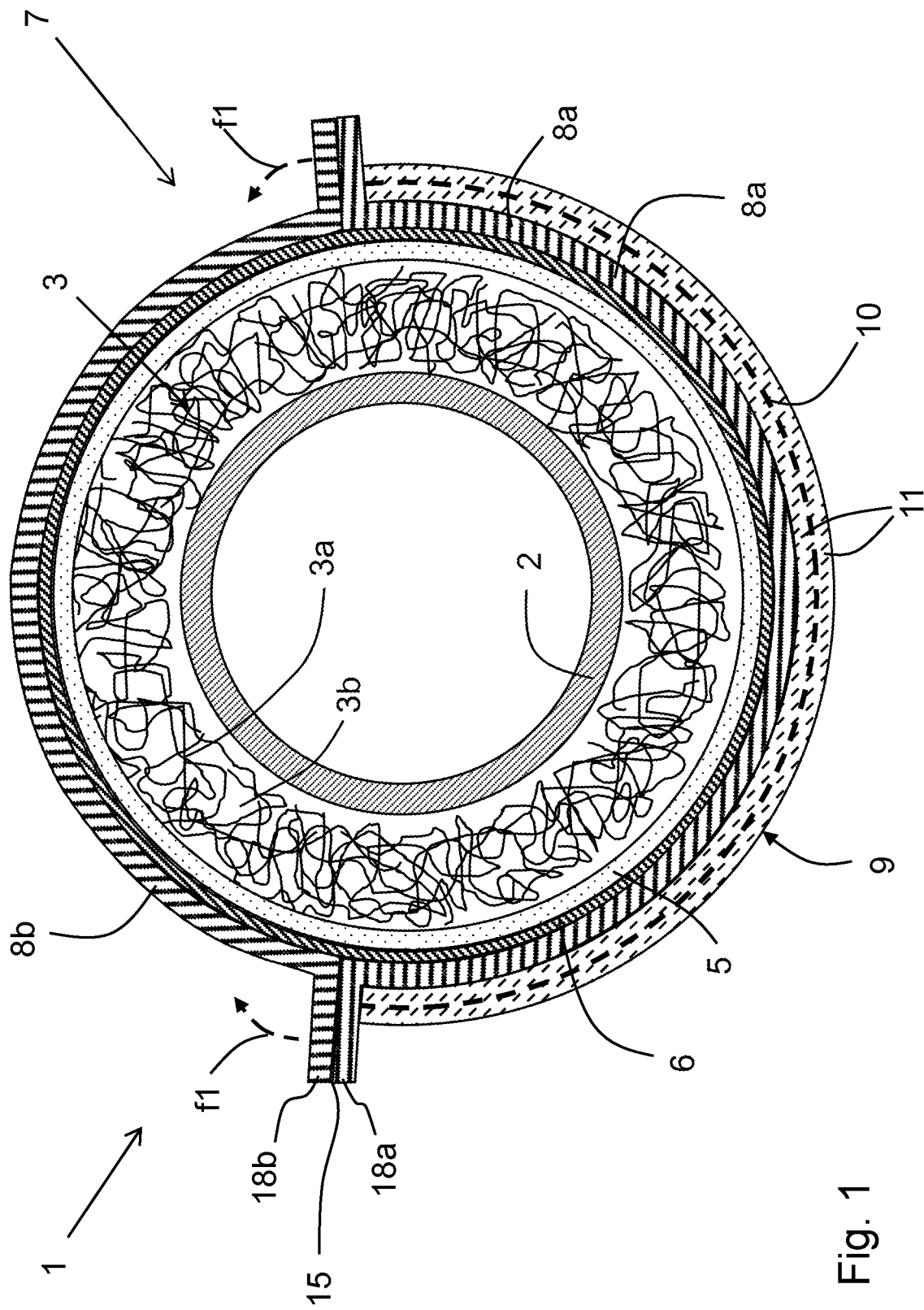
FIG. 1 a first embodiment of a tubular liner in accordance with the invention comprising an outer film system including two outer films and an only partially circumferential reinforcing web, in cross-section.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

Reference will now be made in detail to present exemplary embodiments of the invention, wherein one or more examples of which are illustrated in the accompanying drawings. The detailed description uses numerical and letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

It is important to note that the geometric relations of the components of the tubular liner are not shown true to scale in all figures.

Each of FIGS. 1 to 6 shows a tubular liner 1 in cross-section, represented in the installed state in each case. The tubular liners are flattened for storage and transport. After having been inserted lengthwise into a sewer pipe to be rehabilitated, the tubular liners are inflated with the aid of compressed air or are expanded with the aid of a fluid pumped through the central channel defined along the interior length of the liner 1.

FIG. 1 shows a first exemplary embodiment of a tubular liner 1 in accordance with the invention for lining a sewer pipe to be rehabilitated. The tubular liner 1 extends in the longitudinal direction (into the image plane) usually across dozens or even hundreds of meters. The tubular liner 1 comprises a single-layer or multi-layer inner tubular film 2 consisting of plastic materials, a resin-carrier layer 3, and a protective or wrapping film 6. The resin-carrier layer 3 includes a carrier material 3a and a UV-reactive resin 3b. The protective or wrapping film 6 surrounds the resin-carrier layer 3 and likewise consists of plastic materials. The side of the protective or wrapping film 6 that is directed to the resin-carrier material 3a (see further below) also can comprise a material that is absorbent for liquids and resins, such as a fleece 5. If a wrapping film 6 is used for wrapping the resin-carrier layer 3 with a partial overlap of the wrapping layers, then this wrapping film 6 preferably also can be provided with a fleece 5 on both sides, i.e., interior and exterior.

In principle, the inner tubular film 2, which preferably contains an olefin homo-polymer or copolymer at least in one layer, is known from the state of the art, whereas various versions exist. The inner tubular film 2 may contain different layers, whereas, in particular, there is a permeability for UV radiation, in order to lead a UV radiation source through the cavity in the longitudinal direction of the tubular liner 1 formed by the inner tubular film 2, and thereby dry the reactive resin 3b that is curable by UV radiation. After the tubular liner 1 has been installed and cured, the inner film 2 can be withdrawn in the sewer pipe to be rehabilitated and can be removed from the sewer pipe, or it can remain in the sewer pipe as part of the tubular liner 1 if it can bond with the resin-carrier system 3.

Glass fibers, for example, are used as the carrier material 3a of the resin-carrier layer 3. UV-reactive plastic resins, which are known to the artisan in the field of pipe rehabilitation, are possible reactive resins 3b.

The protective or wrapping film 6, preferably including fleece 5 laminated thereon, can be helically wrapped around the resin-carrier layer 3 in the longitudinal direction of the tubular liner 1 (i.e., into the image plane). Alternatively, the resin-carrier layer 3 is completely enclosed in the longitudinal direction of the tubular liner 1 (i.e., into the image plane) with a protective or covering film 6 and preferably a fleece 5, which has been laminated onto the protective film 6, wherein this composite made of protective film 6 and fleece 5 is closed with a longitudinal seam (extending in the longitudinal direction of the tubular liner 1). The fleece side can be sealed to the film side of the aforementioned composite.

The protective or wrapping film 6 can be single-layer or multi-layer and can be based on at least one homo-polymer or at least one co-polymer, for example, a polyethylene or polypropylene. Preferably, a polyamide layer is contained in the protective or wrapping film 6.

This protective or wrapping film 6 can be obtained, for example, by coating a non-woven material or a fleece with one or more polymers (the latter being layered, i.e., successively applied in the form of layers). This is carried out, for example, with the aid of extrusion coating.

As mentioned, in accordance with FIG. 1, the protective or wrapping film 6 is laminated on its side directed to the resin-carrier layer 3 with a textile fleece 5. The fleece 5 facilitates the adhesion to the resin 3b and to the carrier system 3a impregnated with the resin 3b and ensures that excess air is expelled and, therefore, further increases the stability of the tubular liner 1. The protective or wrapping film 6 can comprise, in particular, one or more barrier layers, in particular a polyamide, in order to prevent the styrene derived from the resin 3b from escaping the resin-carrier layer 3. Moreover, additional barrier chemicals, for example EVOH, may be contained in the single-layer or multi-layer film 6.

An outer film system 7, which in the present case comprises a lower outer film 8a, an upper outer film 8b, and a reinforcing web 9, is arranged around the protective or wrapping film 6. The lower outer film 8a extends, in accordance with the view in cross-section, in an angular range of approximately 190°, whereas the upper outer film 8b extends in an angular range of approximately 170°. The longitudinal edges 18a, 18b of the two outer films 8a, 8b, respectively, each protrude outwardly and rest on one another via their inner sides. These overlapping longitudinal edges 18a, 18b can be sealed together and then form a connecting point 15 in each case. This is readily possible, for example, when the layers to be sealed together contain, for example, an olefin homo-polymer or copolymer, for example, a polyethylene, optionally more than 50 weight percent thereof. The overlapping longitudinal edges 18a, 18b are preferably folded—after sealing—and are laid onto the upper outer film 8b (see arrow f1) and, optionally, are bonded thereto. Folding in the other direction with optional bonding is also possible.

The two outer films 8a, 8b are designed in the form of translucent, UV-radiation- and short-wavelength, visible light-absorbing and/or -reflecting, single-layer or multi-layer films. The two outer films 8a, 8b preferably each comprise at least one layer based on at least one optionally modified thermoplastic olefin homo-polymer or copolymer, wherein this layer or multiple layers in the entire film comprises/comprise a combination of at least one short-wavelength, visible light-absorbing and/or reflecting, organic or inorganic color pigment or dye, and at least one UV radiation-absorbing and/or reflecting, organic or inorganic compound. In other words, the outer films 8a, 8b prevent the passage of UV radiation and short-wavelength, visible light, so that the resin 3b does not prematurely cure during storage of the tubular liner 1. On the other hand, the outer films 8a, 8b are designed in such a way that they are translucent to such an extent that the outer film system has a transmission of at least 1% for visible light at at least one wavelength in the range of 550 nm to 800 nm.

A reinforcing web 9, which extends (as viewed in cross-section) up to underneath the bent edges of the lower outer film 8a in the present case, is applied from the outside onto the lower outer film 8a, at which bent edges the longitudinal edges 18a protrude. This embodiment is suitable, in particular, for the case in which the reinforcing web 9 is bonded onto the lower outer film 8a only after the remainder of the tubular liner 1 has been closed by applying and sealing the two outer films 8a, 8b.

In accordance with an alternative that is not represented, the reinforcing web 9 terminates with the lower outer film 8a, i.e., is bent perpendicularly at its longitudinal edges away from the remainder of the tubular liner 1. Upon the sealing of the longitudinal edges 18a, 18b, sealing is then carried out across the reinforcing web, which is technically readily possible (see FIG. 2 which shows such an embodiment, although without the sealing or wrapping film 6).

In the present case, the reinforcing web 9 comprises a fabric 10, which is provided with a polymer coating 11. The fabric 10 is made, for example, of a polyester yarn having a yarn count of more than 1000 dtex and forms a woven textile. The mesh size in both directions (MD and CD) is preferably less than 5 mm, for example, 3 mm. The fabric 10 comprises the aforementioned coating 11 on both sides in the present case, wherein, in accordance with one preferred embodiment, the coating 11 directed to the outer film 8a acts as an adhesive in order to bond the reinforcing web 9 to the lower outer film 8a with the aid of these adhesive properties. The polymer coating 11 is, for example, 200 μm thick. If the lower outer film 8a is, for example, likewise 200 μm thick, this results in a thickness of the outer film system 7 in the area of the reinforcing web 9 of approximately 460 μm.

The reinforcing web 9 is designed to be mechanically stable, in particular, according to the features of claim 2, and therefore provides the tubular liner 1 with great durability in the reinforced area. In particular upon being drawn into a sewer pipe to be rehabilitated, the tubular liner 1 slides over the sewer pipe bottom, which is often uneven or even partially sharp-edged. Due to the mechanical durability, a tearing of the reinforcing web 9 and, therefore, the underlying layers, is avoided.

Preferably, the coefficient of friction (COF) of the outer side of the reinforcing web 9 directed to the sewer pipe wall, measured against the outer side of an identical reinforcing web, is less than 1.5, preferentially less than 1.0, and most preferentially less than 0.7. Such a low coefficient of friction facilitates the sliding drawing-in of the tubular liner 1, which slips with the reinforcing web 9 on the sewer pipe bottom. These frictional properties also preferably apply for the following exemplary embodiments and preferentially, in general, for the outer film system 7 in accordance with the invention. The specialist is very familiar with the measurement of the frictional and sliding properties and with the measurement of the coefficient of friction of films and film surfaces and other flat materials.

In accordance with the invention, the reinforcing web 9 is designed to be translucent, wherein the criterion in the present case is that the entire outer film system 7 has a transmission of at least 1% for visible light at at least one wavelength in the wavelength range of 550 nm to 800 nm. For this purpose, the polymer coating as well as the fabric are translucent, wherein the mesh openings in the fabric make it possible to see through the fabric.

In general, the transmittances of the individual components arranged one behind the other, i.e., in the present case, the reinforcing web 9 (fabric 10 and polymer coating 11) and the outer film 8 (in the present case: 8a and 8b), multiply to form a total transmittance for the outer film system 7. Therefore, the transmittances of the aforementioned components (in coordination with their thickness, of course) are to be selected in such a way that the transmittance of the outer film system 7 for visible light at at least one wavelength in the wavelength range of 550 nm to 800 nm is at least 1%, preferentially at least 3%, and most preferentially at least 5%. The angle of incidence of the light waves is defined in the present case as perpendicular to the surface of the outer film system.

Within the scope of this invention, upon fulfillment of the aforementioned criterion of a transmittance of at least 1%, the term "translucent" is used for the outer film system and the property of the "translucence" is used with respect to the outer film system.

Overall, the outer film system 7 in accordance with the invention is therefore designed to be translucent. This embodiment in accordance with the invention of the outer film system 7 makes it possible for light to shine from the inside or the outside through the cured tubular liner 1 (translucence) and then, due to the radiation which has passed through, it can be detected, with the aid of a camera arranged on the other side of the tubular liner, where a branch, an inlet, or an outlet of the sewer pipe to be rehabilitated is located. If necessary, the camera can also be arranged next to the light source, in order to infer the presence of branch on the basis of a different reflection as compared to adjacent sections of the tubular liner. Thereafter, a robot can be moved to this point. The robot mills an appropriate recess into the tubular liner, so that a connection can be established from the interior of the rehabilitated sewer pipe, which is lined with the tubular liner, to this branch.

The remaining components of the tubular liner 1, i.e., the optionally present protective or wrapping film 6, the fleece 5, which is impregnated with resin in the installed state of the tubular liner, the resin-carrier layer 3, and the inner film 2 have a—usually considerably—greater transmittance than the outer film system 7, and so the outer film system 7 is the decisive element with respect to the total transmission of the tubular liner 1.

The outer films 8a, 8b are expandable as compared to the reinforcing web 9, and so, upon installation of the tubular liner 1 in the sewer pipe to be rehabilitated, the upper outer film 8b—in contrast to the lower outer film 8a, which is restricted in terms of its expansion due to the reinforcing web 9—can expand and come to rest on the upper sewer pipe wall.

When the polymer coating 11 is adhesive, at least on one side, the coated fabric 10 can be adhered to the previously produced arrangement of inner film 2, resin-carrier layer 3, protective or wrapping film 6, and outer films 8a, 8b from the outside, onto the aforementioned outer film 8a.

The above-described features also apply for the following exemplary embodiments, unless described otherwise. In addition, the same reference signs are used for the same or comparable structural features.

Figure 2:
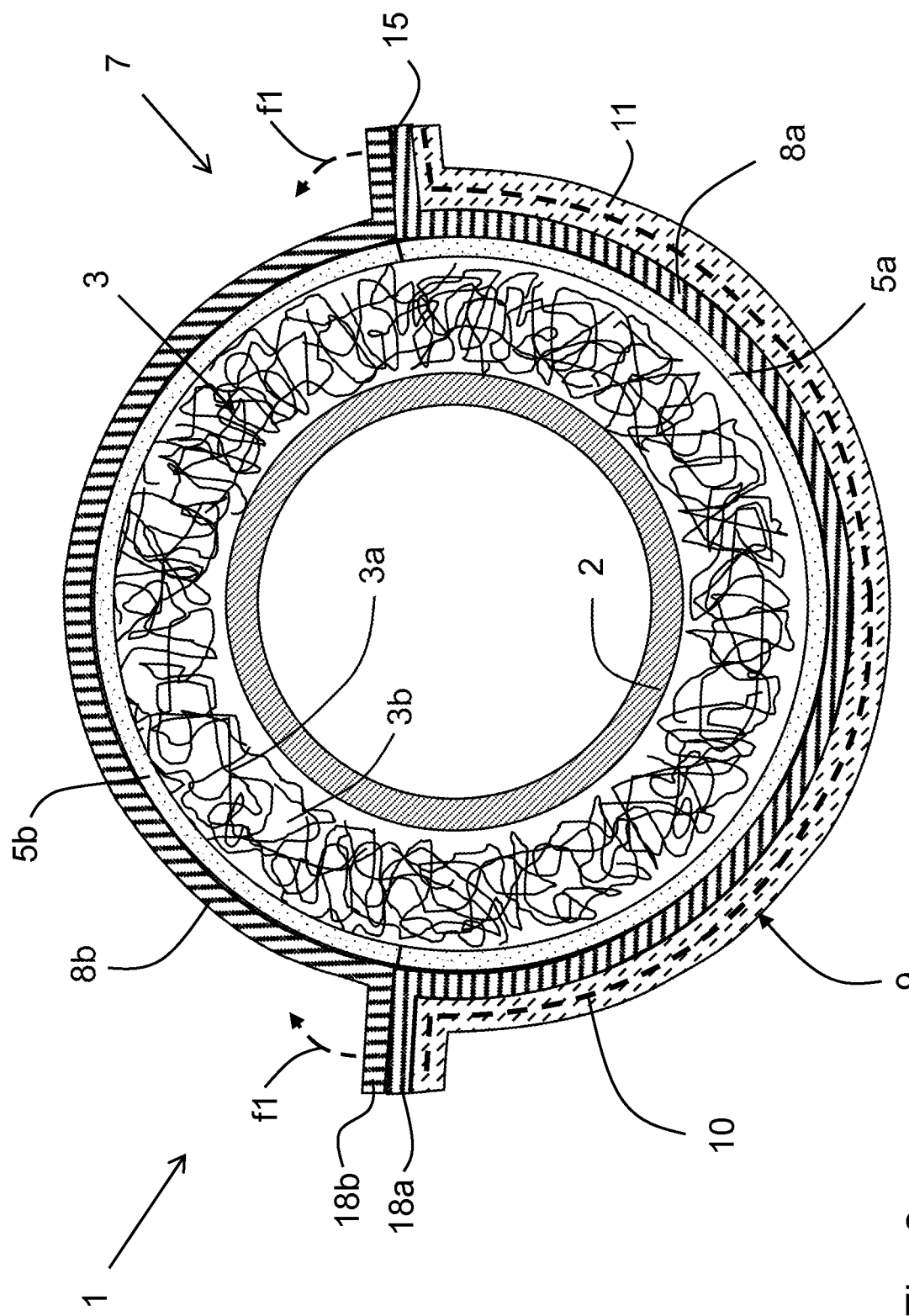
FIG. 2 a second embodiment of a tubular liner in accordance with the invention comprising an outer film system including two outer films and an only partially circumferential reinforcing web, in cross-section.

The second exemplary embodiment of a tubular liner 1 comprising a translucent outer film system 7 in accordance with FIG. 2 differs from that from FIG. 1 in that a protective or wrapping film 6 is not provided here. Instead, two fleece sections 5a, 5b have been directly applied onto the inner side of the outer films 8a and 8b, respectively, preferably with the aid of an adhesive or a polymer (extrusion lamination). Moreover, in this exemplary embodiment, the longitudinal edges of the reinforcing web 9 terminate with the longitudinal edges 18a of the lower outer film 8a, wherein sealing is carried out across the reinforcing web 9 upon the sealing of the longitudinal edges 18a, 18b. In an alternative that is not represented, the longitudinal edges of the reinforcing web 9 extend up to underneath the longitudinal edges 18a of the lower outer film 8a (similar to FIG. 1)

In one further variant, which is not represented, one or both fleeces 5a, 5b coextensively rests/rest on the inner side of the lower outer film 8a or the upper outer film 8b, respectively, and so the longitudinal edges of one fleece or both fleeces 5a, 5b is/are located between the two longitudinal edges 18a, 18b. In the latter case, the fleece 5a is sealed to the fleece 5b, which is readily possible, in particular, when the fleeces 5a, 5b consist of sealable LDPE or LLDPE.

Figure 3:
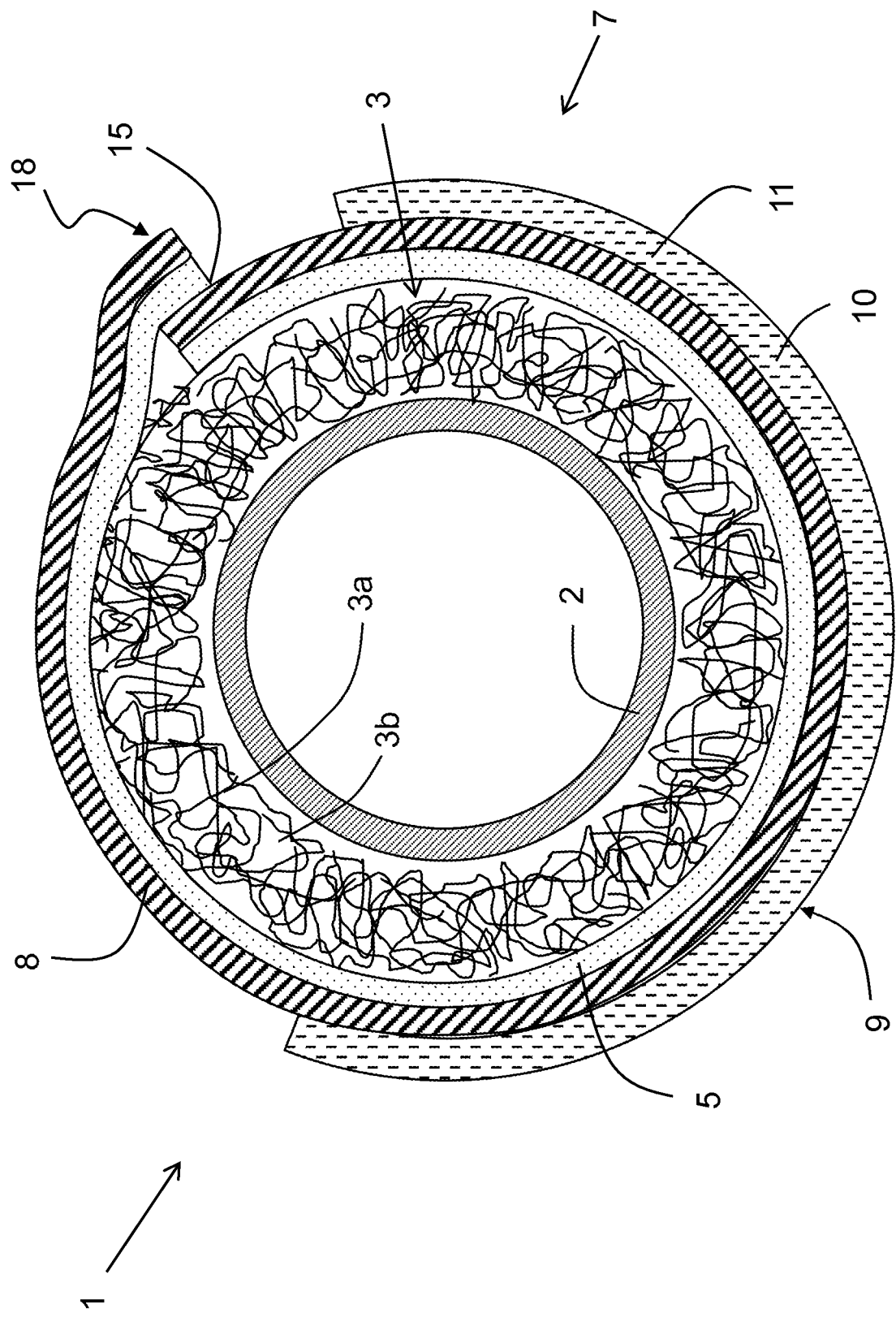
FIG. 3 a third embodiment of a tubular liner in accordance with the invention comprising a single circumferential outer film and an only partially circumferential reinforcing web, in cross-section.

In the third exemplary embodiment of a tubular liner 1 comprising a translucent outer film system 7 in accordance with FIG. 3, only a single outer film 8 is provided, on the inner side of which a fleece 5 has been coextensively applied, and so, in the area of the longitudinal edges 18, the underside of the fleece 5 rests on the top side of the underlying outer film 8, wherein the fleece 5 and the outer film 8 can be sealed together at a connecting point 15 here. Moreover, as in FIG. 1, a protective film can be provided (not represented), which is arranged between the outer film 8 and the fleece 5.

In one embodiment that is not represented, the fleece 5 surrounds the resin-carrier layer 3 about the entire circumference by 360°, while the outer film 8 not only surrounds the resin-carrier layer 3 all the way around, but additionally comprises an overlap area, in which the overlapping first section of the outer film 8 has been placed onto the section lying underneath it and the two are sealed together there, for example. Therefore, in this embodiment as well, no UV light and no short-wavelength light can reach the resin 3b, and so the resin 3b cannot prematurely cure.

In one further embodiment that is not represented, the two opposed inner sides of the now overhanging longitudinal edges of the fleece 5 are sealed together, in order to fold the end, which has been sealed in this way, against the tubular liner 1 (cf. FIG. 1).

The reinforcing web 9 is arranged, in accordance with FIG. 3, about a circumferential angle of approximately 210° around the lower side of the outer film 8. Moreover, the reinforcing web 9 is not designed as a coated fabric 10 (wherein this embodiment would also be readily possible). Instead, in the present case, the reinforcing web 9 is designed as a continuous, mechanically stable film, which is also designed to be translucent, so that the outer film system has the required transmittance. Transparent polyester, for example, is possible as a suitable material for the reinforcing web 9.

Figure 4:
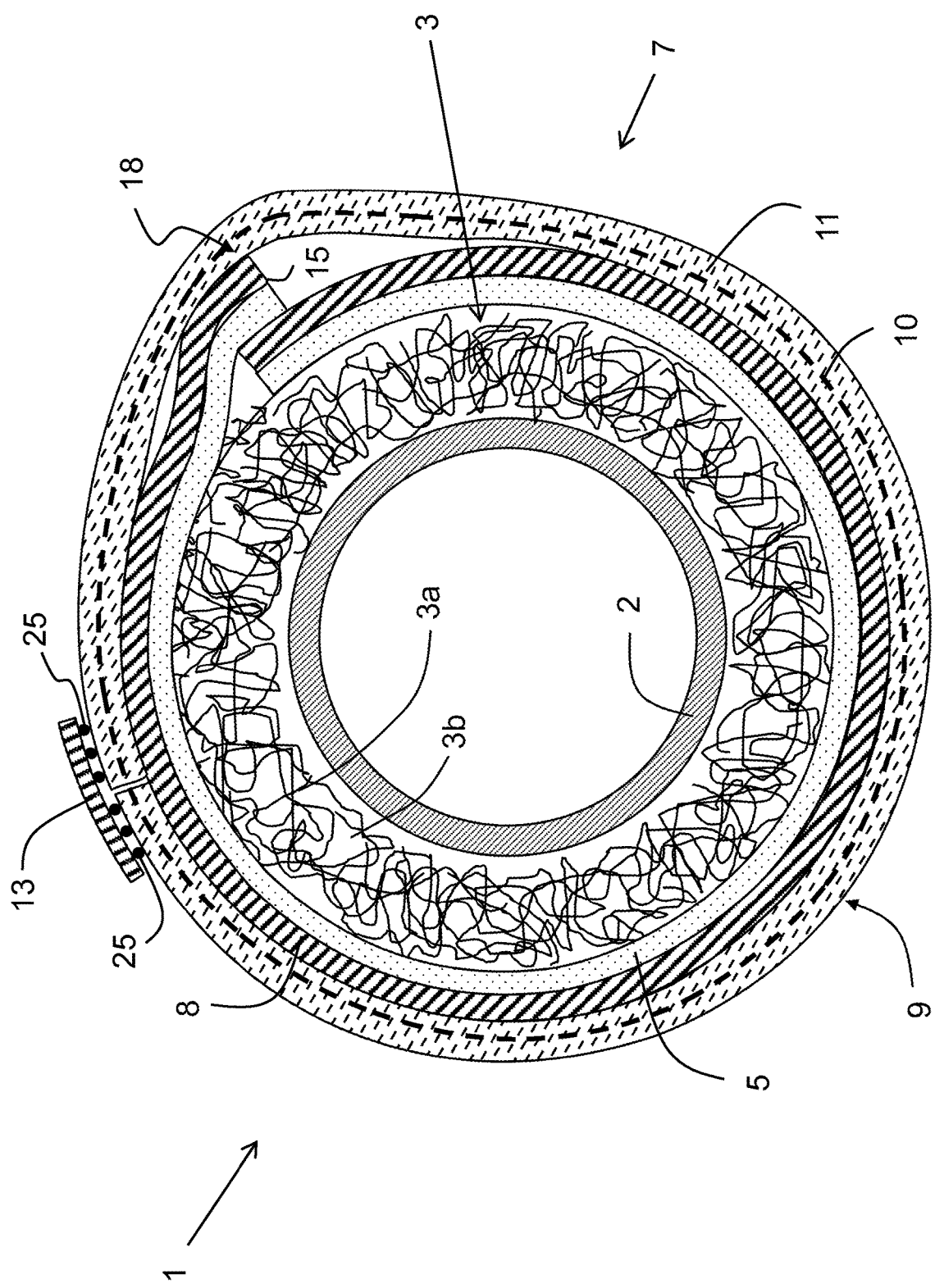
FIG. 4 a fourth exemplary embodiment of a tubular liner in accordance with the invention, in which both the outer film and the reinforcing web are circumferential, in cross-section.

In the fourth exemplary embodiment of a tubular liner 1 comprising a translucent outer film system 7 in accordance with FIG. 4, the reinforcing web 9, in particular, differs from the exemplary embodiment from FIG. 3. On the one hand, in the present case, a fabric 10 comprising a coating 11 on both sides is provided as the reinforcing web 9. On the other hand, this reinforcing web 9 extends around the entire circumference of the tubular liner 1. The end faces of the reinforcing web 9 are positioned directly opposite one another, wherein, in this exemplary embodiment, a narrow sealing strip 13 made of stable plastic and extending in the longitudinal direction of the tubular liner 1 is taped over the end-face abutting edges of the reinforcing web 9, wherein adhesive connecting points 25 are provided, which can expand or even act as a predetermined breaking point, so that the tubular liner 1 can expand upon inflation.

Figure 5:
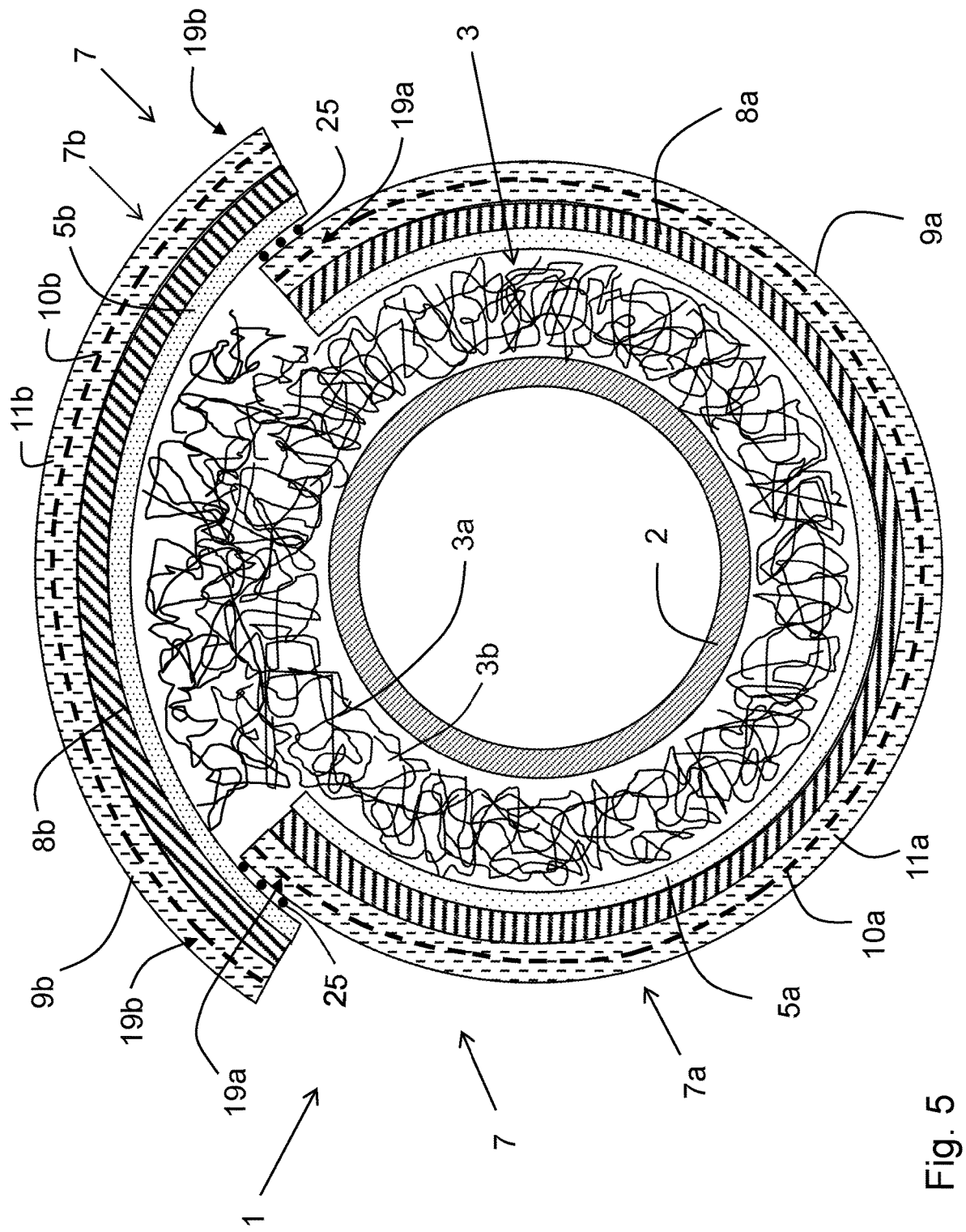
FIG. 5 a fifth exemplary embodiment of a tubular liner in accordance with the invention comprising two subsections, each of which includes one outer film and a reinforcing web, in cross-section.

In accordance with the fifth exemplary embodiment of FIG. 5, the translucent outer film system 7 is designed as two parts. An upper system 7b is placed onto a lower system 7a comprising a lower fleece 5a, a lower outer film 8a, and a lower reinforcing web 9a, which are all coextensively arranged one on top of the other and are connected to one another. While the lower system 7a extends around an angular range of approximately 270°, the upper system arches over the lower system 7b by approximately 120°. The upper system 7b comprises an upper fleece 5b, an upper outer film 8b, and an upper reinforcing web 9b, all of which are designed to be equal in area, i.e., coextensive. Here, the free longitudinal edges of the fleece 5b are connected to the underlying sections of the outer side of the lower reinforcing web 9a at connecting points 25. In FIG. 5, three longitudinal adhesive seams extending into the image plane are represented, by way of example, in each case, as an example for these connecting points 25. As can also be seen in FIG. 5, the two outer films 8a, 8b cover the entire circumference of the tubular liner 1, so that the resin 3b cannot prematurely cure.

In the present case, the reinforcing webs 9a, 9b once again each comprise a fabric 10a or 10b, which is enclosed by a polymer coating 11a or 11b. An embodiment of the reinforcing webs 9a, 9b as full-area films (without fabric) is also possible (cf. FIG. 3).

In order to establish the aforementioned connecting points 25 in FIGS. 4 and 5 (and also in FIG. 6; see below), many different bonding techniques (for example, double-sided adhesive tape) can be used. It is important that, upon the inflation of the tubular liner 1 (after having been inserted into the sewer pipe to be rehabilitated in an unpressurized state), the reinforcing web 9 can expand or the reinforcing webs 9a, 9b can shift with respect to one another; that is, that the connecting points 25 can elongate and possibly break. The connecting points 25 then act as predetermined breaking points.

The elongation in the circumferential direction of the tubular liner 1 (upon the application of radial pressure from the inside during installation of the tubular liner 1), which is realized by the connecting points 25, is helpful, since the elongation of the reinforcing webs 9a, 9b themselves is very low or essentially not present. Due to this elongation, the tubular liner 1 can expand in the circumferential direction upon inflation and, even in its upper area, rest on the sewer pipe wall, whereby a more secure hold and a larger flow cross-section are achieved.

When overlapped, the longitudinal edges 19a of the lower reinforcing web 9a can also be located above the longitudinal edges 19b of the upper reinforcing web 9b. It is also possible that one of the two longitudinal edges 19a of the lower reinforcing web 9a is located above the respective longitudinal edge 19b of the upper reinforcing web 9b, and that the other longitudinal edge 19a of the lower reinforcing web 9a is located below it.

Figure 6:
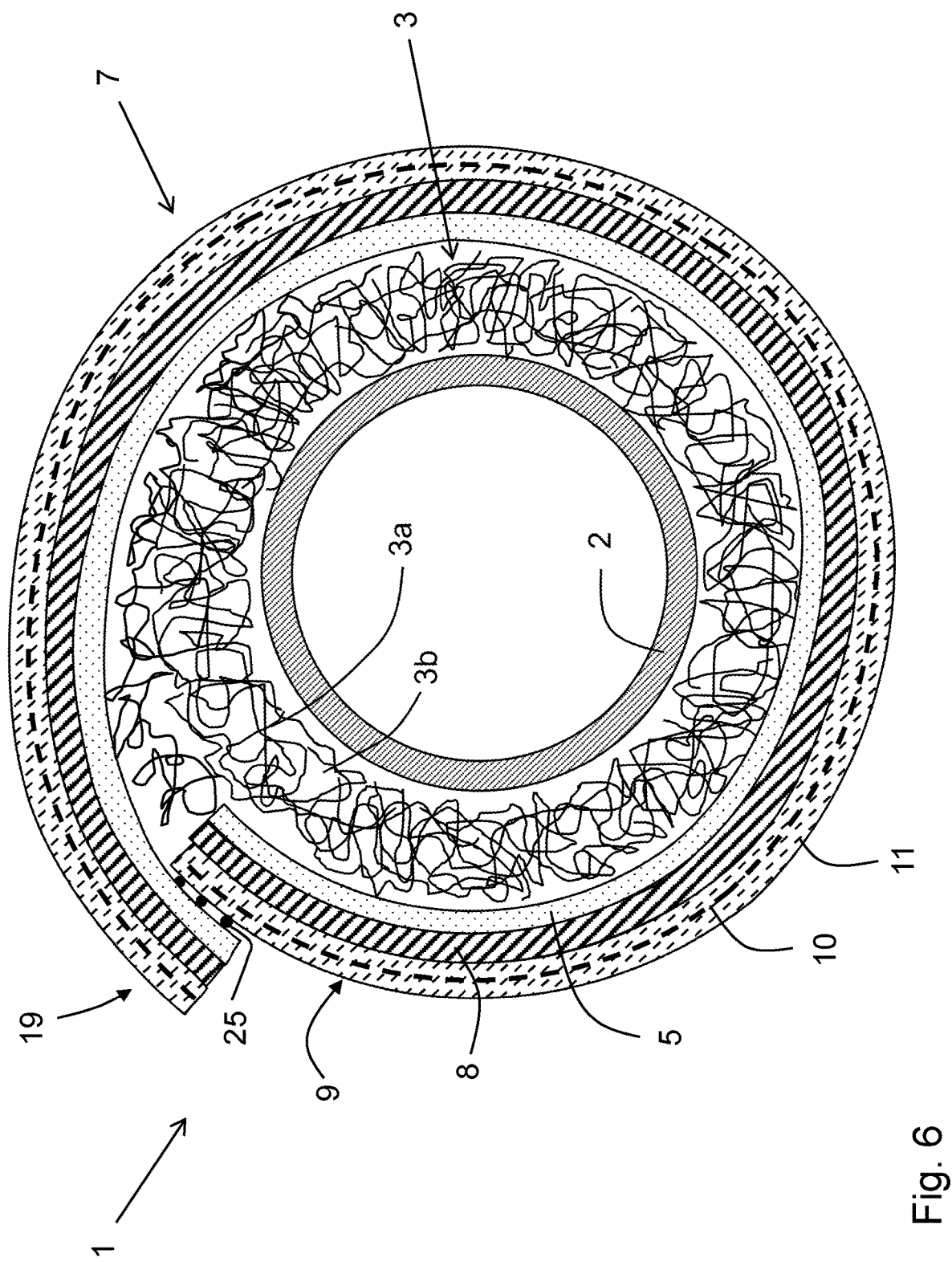
FIG. 6 a sixth exemplary embodiment of a tubular liner in accordance with the invention comprising a wrapping of a reinforcing web including one outer film resting thereon, in cross-section.

FIG. 6 finally presents a sixth exemplary embodiment of a tubular liner 1 in accordance with the invention, comprising a translucent outer film system 7 in accordance with the invention. Here, the outer film system 7 includes only one single outer film 8 and one single reinforcing web 9, both of which are coextensively arranged, wherein the longitudinal edges 19 of the outer film system 7 overlap in the circumferential direction. Due to this arrangement, it is ensured that the outer film system 7 is impermeable for UV light, resin, and air. In the present case as well, again by way of example, three adhesive seams are provided, which are perpendicular to the image plane and extend lengthwise along the tubular liner 1, and which upon the radial elongation of the tubular liner 1, elongate in the circumferential direction and possibly ultimately break; these form connecting points 25. The connecting points 25 are provided, in the present case, in the overlap area between the underside of the overhanging fleece 5 and the top side of the section of the reinforcing web 9 located directly under it. It is irrelevant in the present case as well as in the exemplary embodiments described above in conjunction with FIGS. 4 and 5 as to exactly how the connecting points 25 are geometrically designed; for example, planar connecting points 25 are also possible.

As can also be seen in FIG. 6, a fleece 5, which is used for the adhesion of the resin 3b, is in turn laminated on the inner side of the outer film 8.

The invention was explained in greater detail with reference to different exemplary embodiments. In some of these exemplary embodiments, the reinforcing web or the reinforcing webs is/are designed as a fabric comprising a polymer coating (single-sided or double-sided), preferably also having adhesiveness (wherein this polymer coating can be the same or different on the two surfaces), and in other exemplary embodiments as a full-area film (without inlaid fabric). It is readily possible to replace one type of reinforcing web with the other type of reinforcing web. Moreover, it is possible that the at least one reinforcing web and the at least one outer film are adhesively connected to one another, or that the two rest loosely and unconnected on one another. In one connection of the outer film(s) and the reinforcing web(s), for example, a conventional liner comprising inner film, resin-carrier layer, and outer film can be produced first, and the reinforcing web can then be applied. This is easy to realize, in particular, when the reinforcing web is adhesive, in particular in the form of an appropriate polymer coating on a fabric. After the adhesion of the reinforcing web(s), the tubular liner can be drawn into a sewer pipe. This method has the advantage that a sealing of the outer film(s) is easily possible, since no reinforcing web(s) is/are obstructive.

If the outer film system, including at least one outer film and one reinforcing web, is initially produced independently as a separate, interconnected unit, it is advantageous to use this outer film system for sealing, i.e., for closing, the tubular liner. The specialist knows the different sealing techniques (for example, pulsed, touch, high-frequency, or ultrasonic sealing or welding).

Here, for example, the composite or the outer film system made of the at least one outer film and the at least one reinforcing web (for example, in the form of a lower half shell, which is hardly able or not able to elongate) can be sealed to one further outer film (preferably then in the form of an upper half shell which is relatively well able to elongate), on which no reinforcing web rests. This embodiment is comparable to the embodiments from FIGS. 1 and 2.

Finally, it is also conceivable that no fleece is used, but rather that the resin-carrier layer is also arranged in the tubular liner without such a fleece.

What is claimed is:

1. A tubular liner for rehabilitating the wall of a pipe, the tubular liner comprising:
   an inner tubular film extending in a longitudinal direction of the tubular liner;
   a resin-carrier layer extending in the longitudinal direction of the tubular liner and surrounding the inner tubular film, wherein the resin of the resin-carrier layer is curable with the aid of UV radiation; and
   an outer film system surrounding the resin-carrier layer and extending in the longitudinal direction of the tubular liner and configured for mechanically protecting the resin carrier layer, wherein the outer film system absorbs and/or reflects at least 97% of light having a wavelength in the range 350 nm to 450 nm, wherein the outer film system exhibits a transmittance of at least 3% for light at at least one wavelength in the range of 550 nm to 800 nm, wherein the outer film system includes a reinforcing web that is mechanically stable, and wherein the reinforcing web, in the installed situation of the tubular liner, faces outwards towards the pipe wall.

2. The tubular liner of claim 1, wherein the reinforcing web has one or more of the following mechanical properties:
   a) the tensile strength longitudinal to the machine direction in accordance with DIN EN ISO 527-3 (2013) is greater than 20 N/mm$^2$;
   b) the tensile strength transverse to the machine direction in accordance with DIN EN ISO 527-3 (2013) is greater than 20 N/mm$^2$;
   c) the tensile strength in accordance with DIN EN ISO 1421 (1998) is greater than 200 N/5 cm;
   d) the elongation at tear or break in a longitudinal direction (EB) and elongation at tear or break in a transverse direction (EB) in accordance with DIN EN ISO 527-3 (2013) and DIN EN ISO 527-3 (2013), respectively, is less than 200%;
   e) the resistance to further tears in a trapezoidal manner in a longitudinal direction or in a trapezoidal manner in a transverse direction in accordance with DIN 53363 (2003) and DIN 53363 (2003), respectively, is greater than 100 N; or
   f) the puncture resistance in accordance with ASTM E 154 (2008) is greater than 300 N.

3. The tubular liner of claim 1, wherein the outer film system exhibits a transmittance of at least 5% for light at at least one wavelength in the range of 550 nm to 800 nm.

4. The tubular liner of claim 1, wherein the outer film system absorbs and/or reflects at least 99% of light having a wavelength in the range 350 nm to 450 nm.

5. The tubular liner of claim 1, wherein the reinforcing web has a mesh size in the machine direction (MD) and/or in the cross direction (CD) of less than 5 mm.

6. The tubular liner of claim 5, wherein the reinforcing web is made of polyester yarn.

7. The tubular liner of claim 1, wherein the reinforcing web has an adhesive polymer coating that binds the reinforcing web to a film of the outer film system.

8. The tubular liner of claim 1, wherein the reinforcing web includes a carrier fabric and a layer of polyvinyl chloride (PVC).

9. The tubular liner of claim 1, wherein the outer film system includes a connecting line that extends in the longitudinal direction of the tubular liner, and wherein the connecting line is arranged between the two longitudinal edges of the reinforcing web.

10. The tubular liner of claim 1, wherein the outer film system includes a compound with a yellow pigment, and wherein the compound with the yellow pigment absorbs and/or reflects at least 97% of light having a wavelength in the range 350 nm to 450 nm.

11. An outer film system for use in a tubular liner for the rehabilitating a pipe, the outer film system comprising:
    an outer film that absorbs and/or reflects at least 97% of light having a wavelength in the range 350 nm to 450 nm, wherein the outer film system exhibits a transmittance of at least 3% for light of at least one wavelength in the range of 550 nm to 800 nm, wherein the outer film system is configured for surrounding a resin-carrier layer of the tubular liner and for extending in a longitudinal direction of the tubular liner, and wherein the resin-carrier layer includes resin that is curable by UV light; and
    a reinforcing web that is mechanically stable and that surrounds and contacts the outer film, wherein the outer film surrounds and contacts the resin-carrier layer, and wherein the reinforcing web, in the installed state of the tubular liner in the pipe, is adjacent to the pipe wall.

12. The outer film system of claim 11, wherein the reinforcing web has a mesh size in the machine direction (MD) and/or in the cross direction (CD) of less than 5 mm.

13. The outer film system of claim 11, wherein the outer film system has a thickness of between 50 μm and 1000 μm.

14. A tubular liner comprising:
    an inner tubular film that extends in a longitudinal direction of the tubular liner;
    a resin-carrier layer that extends in the longitudinal direction of the tubular liner, wherein the resin-carrier layer surrounds and contacts the inner tubular film, and wherein the resin-carrier layer includes a resin that cures when exposed to UV radiation; and
    an outer film system that extends in the longitudinal direction of the tubular liner, wherein the outer film system surrounds and contacts the resin-carrier layer, wherein the outer film system is adapted to mechanically protect the resin-carrier layer, wherein the outer film system absorbs and/or reflects at least 97% of light having a wavelength in the range 350 nm to 450 nm, wherein the outer film system permits a transmission of at least 3% of light in at least one wavelength in the range of 550 nm to 800 nm, wherein the outer film system includes a reinforcing web that is mechanically stable, and wherein the reinforcing web, in an installed state of the tubular liner in a pipe, is adjacent to an inner wall of the pipe.

15. The tubular liner of claim 14, wherein the reinforcing web has a tensile strength longitudinal to the machine direction (MD) of greater than 20 N/mm$^2$ and a puncture resistance in accordance with ASTM E 154 (2008) of greater than 300 N.

16. The tubular liner of claim 14, wherein the outer film system includes a connecting line that extends in the longitudinal direction of the tubular liner, and wherein the connecting line is arranged between the two longitudinal edges of the reinforcing web.

17. The tubular liner of claim 14, wherein the reinforcing web has an adhesive polymer coating that binds the reinforcing web to a film of the outer film system.

18. The tubular liner of claim 14, wherein the outer film system includes a compound with a yellow pigment, and wherein the compound with the yellow pigment absorbs and/or reflects at least 97% of light having a wavelength in the range 350 nm to 450 nm.

19. The tubular liner of claim 18, wherein the outer film system includes a UV absorber in addition to the compound with the yellow pigment.

* * * * *